United States Patent

Fujikawa et al.

[11] Patent Number: 5,870,527
[45] Date of Patent: Feb. 9, 1999

[54] ROBOT CONTROL METHODS AND APPARATUS

[75] Inventors: Takayuki Fujikawa, Kanagawa; Masahiro Fujita, Saitama, both of Japan

[73] Assignee: Sony Corporation, Japan

[21] Appl. No.: 730,934

[22] Filed: Oct. 16, 1996

[30] Foreign Application Priority Data

Oct. 17, 1995 [JP] Japan .................................. 7-268422

[51] Int. Cl.[6] ........................... G05B 11/32; G05B 19/42
[52] U.S. Cl. ............................... 395/80; 395/93; 395/85; 395/670; 395/672; 395/673; 395/674
[58] Field of Search ........................ 395/85, 670, 672, 395/673, 674

[56] References Cited

U.S. PATENT DOCUMENTS

| 5,008,834 | 4/1991 | Mizuno et al. | 364/513 |
| 5,250,886 | 10/1993 | Yasuhara et al. | 318/567 |
| 5,303,384 | 4/1994 | Rodriguez et al. | 395/99 |
| 5,325,468 | 6/1994 | Tersaaki et al. | 395/97 |
| 5,430,643 | 7/1995 | Searji | 364/167.01 |
| 5,513,299 | 4/1996 | Terasaki et al. | 395/90 |
| 5,519,814 | 5/1996 | Rodriguez et al. | 395/99 |
| 5,545,960 | 8/1996 | Ishikawa | 318/587 |
| 5,550,953 | 8/1996 | Searji | 395/98 |
| 5,608,843 | 3/1997 | Baird, III | 395/23 |

OTHER PUBLICATIONS

Kiyoshi, et al., "Trajectory Planning Using Optimum Solution of Variational Problem", 1993 Power Conference IEEE, p. 666–671.

Sungtaeg Jun, et al., "A Probabilistic Approach to Collision–free robot path Planning", Robotics and Automation 11988 IEEE Int'l Conference, p.220–225.

Hiroshi Ueno, et al. "On Control and Planning of a Space Station Robot Walker", Systems Engineering, 1990 IEEE Int'l Conference, p. 220–223.

Primary Examiner—Tario R. Hafiz
Assistant Examiner—Jagdish Patel
Attorney, Agent, or Firm—Ronald P. Kananen

[57] ABSTRACT

A robot control method for controlling the operation of a robot so as to pass through a plurality of states corresponding to a predetermined operation, comprising determining at least one operational arc between two directly passable states among the plurality of states showing the operation of the robot when passing between the two states, giving to each of the determined operational arcs a weighting coefficient corresponding to the probability of that operational arc being selected, selecting on a probable basis one of the operational arcs between the two states when making the operation of the robot pass between the two states based on the weighting coefficients of the operational arcs between the two states, and controlling the robot so as to perform the operation shown by the selected operational arc when making the operation of the robot pass between the two states.

5 Claims, 8 Drawing Sheets

FIG. 1A
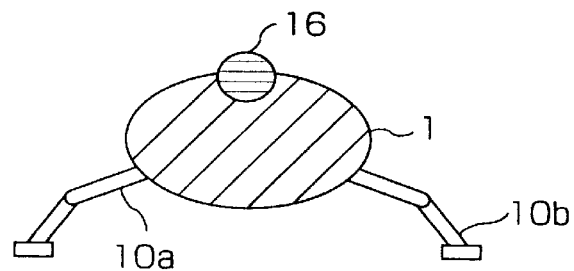
FIG. 1B
FIG. 1C
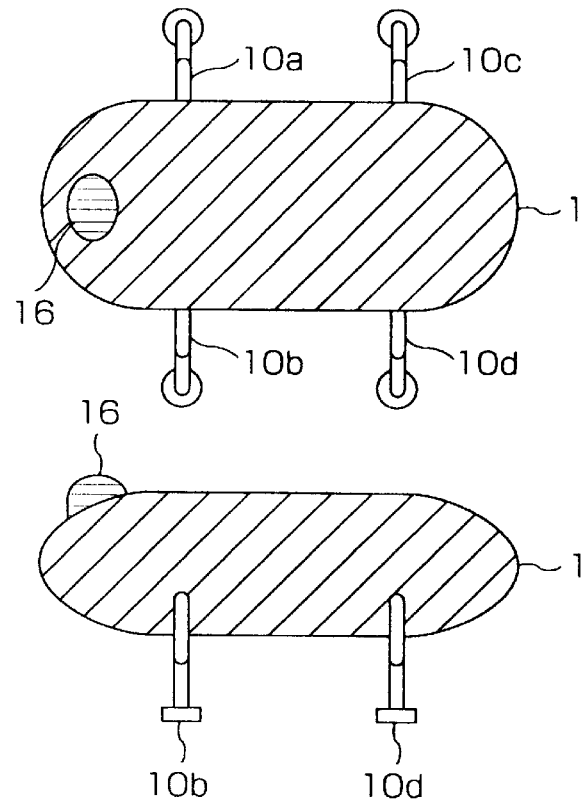

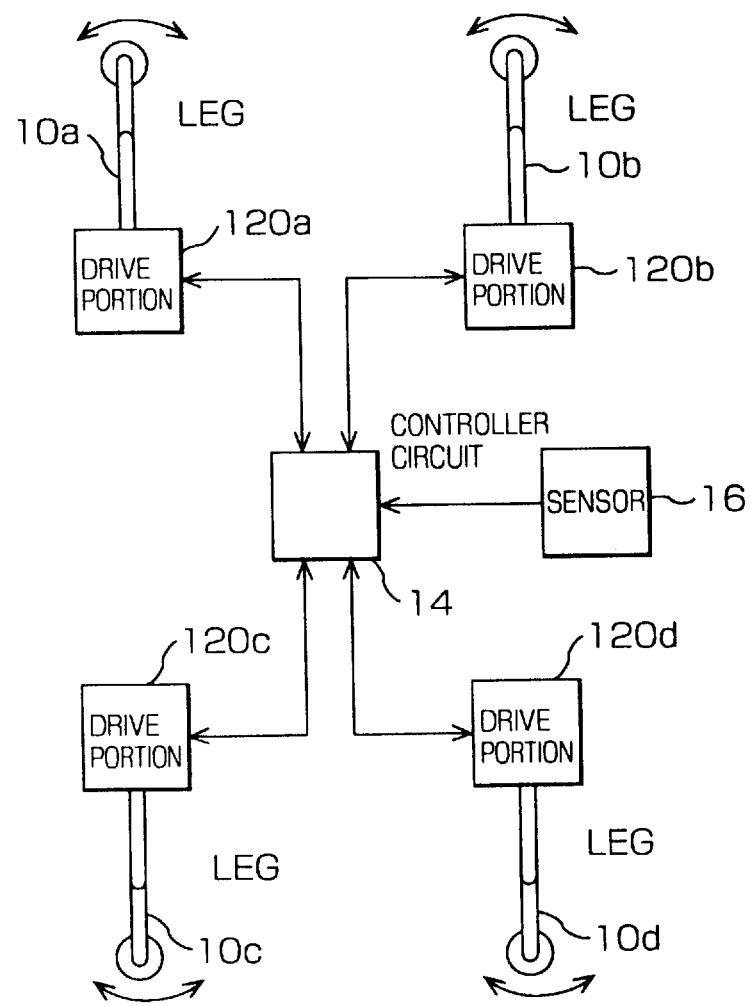

A32 ⟶ A22 ⟶ A21 ⟶ A11 ⟶ A14 ⟶ A44

ROBOT CONTROL METHODS AND APPARATUS

BACKGROUND OF THE INVENTION

1. Field of the Invention

The present invention relates to the civilian or industrial use of robots, more particularly to methods and an apparatus for the control of the pattern of action of a robot.

2. Description of the Related Art

When teaching action to a robot, it had been necessary to first program all of the desired patterns of action and their order and then store them in the robot or a control apparatus of the robot. When the actions are determined by a program, a robot operates exactly according to the patterns of action described in the program. Accordingly, it was not possible to make the actions of the robot more diverse and there were limits to what could be expressed by the actions of the robot. The expressability could not have been said to be adequate.

Recently, as a system for control enabling the actions of a robot to be changed in accordance with the changing dynamic environment around it, the system of subsumption architecture for layered control of basic actions such as avoidance and evasion of obstructions has been proposed (Rodney A. Brooks, "A Robust Layered Control System for A Mobile Robot", IEEE Journal of Robotics and Automation, vol. RA-2, no. 1, March 1986).

According to this system, when the actions belonging to the higher layer are not suitable for the surrounding environment and end in failure, the robot is constantly guided to take action belonging to the lower layer. When conversely the action belonging to the lower layer failed, however, it was difficult to positively guide the robot to take action belonging to the higher layer.

Further, according to the subsumption architecture system, patterns of action were given by superposition of layered actions. Since however the patterns of actions contained in each layer were fixed, limitations again ended up being placed on the diversity of the patterns of action.

In this way, even in the subsumption architecture system, over-simplification of the patterns of action of the robot could not be avoided and there were limits to the expressability of the operations of the robot itself.

SUMMARY OF THE INVENTION

The present invention was made in consideration of the above problems in the related art and has as its object to provide methods and an apparatus for the control of the actions of a robot which enable the operations of the robot to be made more diversified, the matter expressable by the operations increased, and further the expressability of the operations of the robot enhanced.

Accordingly to one aspect of the present invention, there is provided a robot control method for controlling the operation of a robot so as to pass through a plurality of states corresponding to a predetermined operation, comprising determining at least one operational arc between two directly passable states among the plurality of states showing the operation of the robot when passing between the two states, giving to each of the determined operational arcs a weighting coefficient corresponding to the probability of that operational arc being selected, selecting based on probability one of the operational arcs between the two states when making the operation of the robot pass between the two states based on the weighting coefficients of the operational arcs between the two states, and controlling the robot so as to perform the operation shown by the selected operational arc when making the operation of the robot pass between the two states.

Preferably, when making the operation of the robot pass between two or more states among the plurality of states, the operational arcs are selected between each two directly passable states among the two or more states so that the sum of the weighting coefficients becomes smallest.

Preferably, the operational arc includes a self operational arc showing the operation of the robot when returning from one state among the plurality of states to the same one state.

According to another aspect of the invention, there is provided a robot control method for controlling the operation of a robot so as to pass through a plurality of states corresponding to a predetermined operation, comprising a step of receiving a starting operating state and a target operating state of the robot and a step of selecting a path giving the smallest sum of weighting coefficients when passing from the starting state to the target state based on a predetermined status transition chart having a plurality of states and given weighting coefficients showing the ease of passage between states.

Preferably, at least one operational arc is defined between each two states, when there are a plurality of operational arcs between two states, each of those operational arcs is given a probability of passage showing the chance of passage, and one of the plurality of operational arcs between the two states is selected in accordance with the probability of passage.

According to still another aspect of the invention, there is provided a robot control apparatus for controlling the operation of a robot having a plurality of states corresponding to a predetermined operation, at least one operational arc being determined between each of any two directly passable states among the plurality of states showing the operation of the robot when passing between the two states, comprising a weighting means for giving to each of the determined operational arcs a weighting coefficient corresponding to the probability of that operational arc being selected, an operational arc selecting means for selecting based on probability one of the operational arcs between the two states when making the operation of the robot pass between the two states based on the weighting coefficients of the arcs of operation between the two states, an operating data producing means for producing along with time operating data corresponding to the operation of the robot shown by the selected operational arc, and controlling means for controlling the operation of the robot based on the produced operating data.

Preferably, the operational arc includes a self operational arc showing the operation of the robot when returning from one state among the plurality of states to the same one state and the operating data producing means suppresses the production of the operating data corresponding to the self operational arc before the transition in states and after the transition in states when the states of the robot before the transition of states and after the transition of states coincide.

In the methods and apparatus for control of a robot according to the present invention, the states corresponding to basic operations of the robot such as "walking", "sitting", and "standing", the operational arcs showing the operations when the robot passes between two states, the self operational arcs showing the operations for a transition in state within the same state, and weighting coefficients given to these operational arcs etc. are defined.

The methods and apparatus for controlling a robot according to the present invention define one or more of the operations when passing between two states directly passable without the intervention of another state between them among these states and select based on probability the operation for passing between these two states for control of the operation of the robot so as to thereby give change to the operations of the robot and increase the expressability of the robot.

In the robot control apparatus according to the present invention, the operational arc selecting means selects based on probability one among the plurality of selectable operational arcs for passing between two directly passable states based on weighting coefficients.

Further, when passing through two or more states from a state at the time of start of the operation to the state at the time of end of the operation, the operational arc selecting means selects the operational arcs giving the smallest sum of the weighting coefficients of the operational arcs linking two states among these states.

The operating data generating means generates along with time the operating data for realizing the movement of the robot shown by the operational arc corresponding to each of the selected operational arcs.

The controlling means controls the rotation etc. of the motors driving the robot based on the generated operating data, makes the robot perform the operations shown by the selected operating data, successively executes the status transitions, and thereby realizes a predetermined action of the robot.

BRIEF DESCRIPTION OF THE DRAWINGS

These and other objects and features of the invention will become clearer from the following description of the preferred embodiments given with reference to the attached drawings, in which:

FIG. 1A, FIG. 1B, and FIG. 1C are views showing the external shape of a robot to which the robot control method according to the present invention is applied, in which FIG. 1A is a front view of the robot, FIG. 1B is a top plane view of the robot, and FIG. 1C is a side view of the robot;

FIG. 2 is a view of the configuration of the control portion used for realizing the robot control method according to the present invention in the robot shown in FIG. 1;

DESCRIPTION OF THE PREFERRED EMBODIMENTS

Preferred embodiments of the present invention will be explained below.

FIG. 1A, FIG. 1B, and FIG. 1C are views showing the external shape of a robot to which the robot control method according to the present invention is applied, in which FIG. 1A is a front view of the robot, FIG. 1B is a top plane view of the robot, and FIG. 1C is a side view of the robot.

Figure 4:
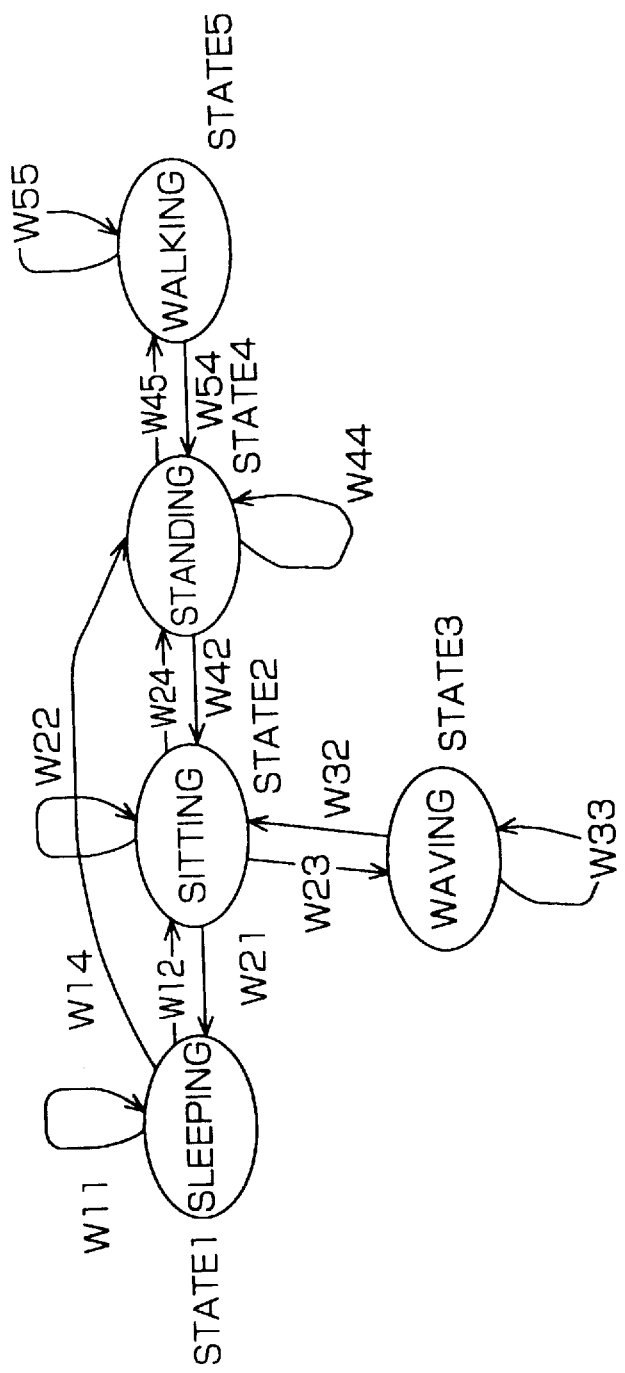
FIG. 4 is a view of the status transition chart showing the relationship among the states, operational arcs, and weighting coefficients of the robot shown in FIG. 1.

As shown in FIGS. 1A to 1C, the robot 1 has four legs $10a$ to $10d$ which are driven controlled by the robot control methods according to the present invention. The basic operations of the robot 1 called "sleeping (state 1)", "sitting (state 2)", "waving (state 3)", "standing (state 4")", and "walking (state 5)" are defined here as the "states" (FIG. 4 etc.). Further, when passing between such states, the robot 1 operates based on "operational arcs" which are defined in advance, are given weighting coefficients corresponding to the probabilities of being selected, are selected based on the probabilities, and define operations of the robot 1 when passing between these states.

FIG. 2 is a view of the configuration of the control portion used for realizing the robot control method according to the present invention in the robot shown in FIG. 1.

As shown in FIG. 2, the control portion 12 of the robot 1 is comprised of a control circuit 14, drive portions $120a$ to $120d$, and a sensor 16.

The control circuit 14 is comprised of a microprocessor, ROM, RAM, and peripheral circuits required for computations. It executes the program (FIG. 3) for realizing the robot control method according to the present invention and supplies operating data showing the movement of the legs $10a$ to $10b$ to the drive portions $120a$ to $120d$ based on the data defining the preset states and the sensor data etc. input from the sensor 16.

The sensor 16 detects for example the environment surrounding the robot 1, such as the intensity or color of the light or temperature and the distance to the walls surrounding it or other robots 1, and outputs the sensor data concerning the surrounding environment detected to the control circuit 14.

The drive portions $120a$ to $120d$ are comprised of motors, motor drive circuits, etc. and move the legs $10a$ to $10d$ back and forth and up and down based on the operating data input from the control circuit 14. That is, the control circuit 14 and drive portions $120a$ to $120d$ operate in conjunction and realize the operation of the robot 1 in different states and the operation of the robot during the transition between states.

Figure 3:
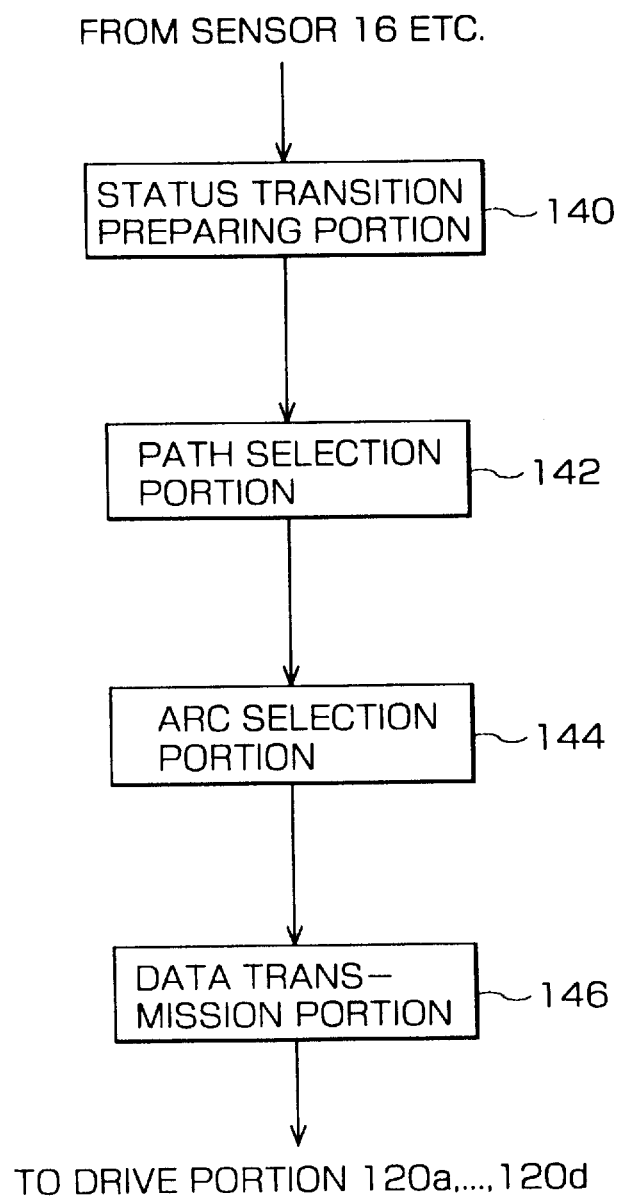
FIG. 3 is a view of the configuration of a program for realizing the robot control method according to the present invention.

FIG. 3 is a view of the configuration of a program for realizing the robot control method according to the present invention.

The status transition preparation portion 140, path selection portion 142, arc selection portion 144, and data transmission portion 146 shown in FIG. 3 are stored in the ROM of the conntrol circuit 14 and are executed by the microprocessor of the control circuit 14.

Operation of Status Transition Preparation Portion 140

The status transition preparation portion 140 sets the states passed through from the state at the start of the operation of the robot 1 (starting state) to the state at the end of the operation (target state) and prepares a status transition chart (FIG. 4 etc.) based on the set states and the operational arcs at the time of transition between states.

First, it defines in advance the states to be realized by the robot 1 and defines one or more operational arcs showing the operation of the robot 1 at the time of transition between states between each two directly passable states so as to make the robot 1 pass directly between the defined states. It gives to each of these defined operational arcs a weighting coefficient corresponding to the probability of it being selected by the arc selecting portion 144.

The states and operational arcs defined above can be expressed in a status transition chart. That is, the operational arcs $A_{ij}$ for changing the operation of the robot 1 from the state $S_i$ to the state $S_j$ are defined for the two defined states $S_i$ and $S_j$.

The operational arcs $A_{ij}$ are given the weighting coefficients $w_{ig}$. The operational arcs $A_{ij}$ included in the final operational path can be selected from N number of operational arcs $A^k_{ij}$ (k=1, . . . , N). The probable weight $P^k$ (k=1, . . . , N) of an operational arc $A^k_{ij}$ being selected is shown by the following formula:

$$1 = \sum_{k=1,\ldots,N} P^k \quad (1)$$

Figure 5:
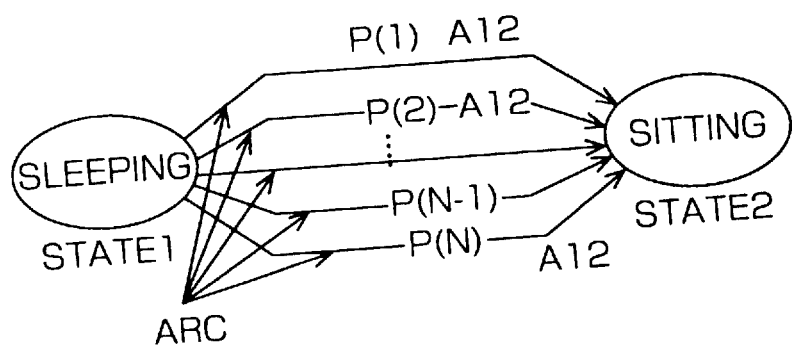
FIG. 5 is a view showing N number of operational arcs defined between two states positioned adjoining each other in FIG. 4 and able to be directly passed between without the intervention of another state.

FIG. 4 is a view of a status transition chart showing the relationship among the states, operational arcs, and weighting coefficients of the robot 1. Note that FIG. 4 shows single operational arcs, but these may be multiple arcs as well as shown in FIG. 5. In this case, equation 1 is satisfied.

For example, as shown in FIG. 4, the weighting coefficient $w_{12}$ is given to the operational arc for the transition from the state 1 where the robot 1 retracts its legs 10a to 10d under it and places its bottom down on the floor (sleeping) to the state 2 where the robot 1 retracts its legs 10a and 10b, extends its legs 10c and 10d, and places just its bottom at the side of the legs 10c and 10d down on the floor (sitting).

Further, the weighting coefficient $w_{14}$ is given to the operational arc for the transition from the state 1 (sleeping) to the state 4 where the robot 1 extends its legs 10a to 10d and maintains its bottom parallel to the floor (standing). Further, the weighting coefficient $w_{21}$ is given to the operational arc for the transition from the state 2 to the state 1.

Operational arcs are defined in the same way between the states 1, 2, and 4 and the other two states [state 3 where the robot 1 alternately extends and retracts its legs 10a and 10b and legs 10c and 10d (waving) and state 5 where the robot 1 walks (walking)] and are given the weighting coefficients $w_{24}, w_{42} \ldots, w_{55}$.

FIG. 5 shows N number of operational arcs defined between two states positioned adjoining each other in FIG. 4 and able to be directly passed between without the intervention of another state. That is, for example, it shows a plurality of operational arcs even for the case of transition in state from "sleeping" to "sitting".

As shown in FIG. 5, there are N number of operational arcs $A_{12}$ defined between the state 1 and state 2. The probabilities of these N number of operational arcs $A_{12}$ being selected by the arc selection portion 144 are given by the probable weights P(1) to P(N).

Operation of Path Selection Portion 142

The path selection portion 142 selects a group of operational arcs giving the smallest sum of the weighting coefficients of the operational arcs included in an operational path based on the status transition chart prepared by the status transition preparation portion 140 as the operational path through which the robot 1 passes from the starting state to the target state. That is, there may be one or more operational arcs between any two directly passable adjoining states included in the operational path. For example, there are more than one operational arcs for the transition from "sleeping" to "sitting".

The path selection portion 142 selects the optimal operational path when setting the robot 1 from the starting state $S_o$ to the target state $S_g$ based on the status transition chart shown in FIG. 4. An "operational path" is defined as a series of operational arcs which starts from the starting state $S_o$ and can reach the target state $S_g$ through directly connected operational arcs. There are generally a plurality of operational paths. The path giving the smallest evaluation function W shown by the following equations is selected.

$$W = \min_{1} W_1 \quad (2)$$

$$W_1 = \sum_{n=0}^{m_1-1} W_{n,n+1} \quad (3)$$

Here, $W_1$ shows the sum of the weighting coefficients of the operational arcs comprising the path 1 able to lead from the starting state $S_o$ to the target state $S_g$. Further, $m_l$ shows the number of the operational arcs $A_{i,j}$ comprising this path (i, j=1, 2, . . . , M, i≠j). In the above equation, M shows the total number of states $S_i$ of the status transition chart shown in FIG. 4.

Below, an explanation will be made of the detailed processing means for selecting a path.

First, as the initial setting, two lists for managing the states $S_i$, that is, a closed list and an open list, are defined.

The starting group of the closed list is an empty group. As the starting group of the open list, all states $S_i$ (i=1, . . . , M) are given as shown in the following equations:

Closed list=φ

Open list={$S_1, S_2, \ldots, S_M$} (4)

Further, as shown by the following equation, the evaluation variables D[i] corresponding to the states $S_1$ are defined as the initial values of the evaluation variables.

$$D[i] = \begin{cases} 0 & i = 0, \text{initial state} \\ \infty & \text{otherwise} \end{cases} \quad (5)$$

Further, as shown by the following equation, the starting state $S_s$ is made the starting connected state $S_p$.

$$S_p = S_s \quad (6)$$

Next, the open list group, closed list group, evaluation variables, and connected states are updated.

Using the equations (7-1) and (7-2) in the following equations, the open list group, closed list group, evaluation variables, and connected state are repeatedly updated until $S_p = S_G$.

$$\min_{S_i} D[i], S_i \in \text{open list} \quad (7\text{-}1)$$

$$D[i] = \min_{S_i} (D[i], D[p] + w(S_p, S_i)), S_i \in \text{closed list} \quad (7\text{-}2)$$

Here, the state $S_i$ satisfying equation (7-1) is updated to the connected state $S_p$ as the new connected state $S_{p'}$. This new connected state $S_{p'}$ is removed from the open list group and added to the closed list group. At this time, the old connected state $S_p$ (OLD) becomes the parent of the new connected state $S_p$ (NEW) and is connected by the pointer.

$$S_p(\text{OLD}) \leftarrow S_p(\text{NEW}) \quad (8)$$

The evaluation variables D[i] are updated by equation (7-2) through this new connected state $S_p$.

Further, the pointer is followed in the closed list from the target state $S_G$ to obtain the series 1 of states=$S_G, \ldots, S_i, \ldots S_j, \ldots, S_s$ leading to the starting state $S_s$. At this time, the operational path from the starting state $S_s$ to the target state $S_G$ of the robot is found from the following equation by following the pointer in the closed list in reverse.

$$A_{0,1_1} \to A_{1_1,1_1} \to A_{1_1,1_2} \to A_{1_2,1_2} \to \ldots \to A_{1_{m-1},1_{m-1}} \to A_{1_{m-1},G} \quad (9)$$

As explained above, with the exception of the starting state $S_s$, the $A_{i,i}$ corresponding to the state $S_i$ through which the operational path passes is always selected.

Figure 6:
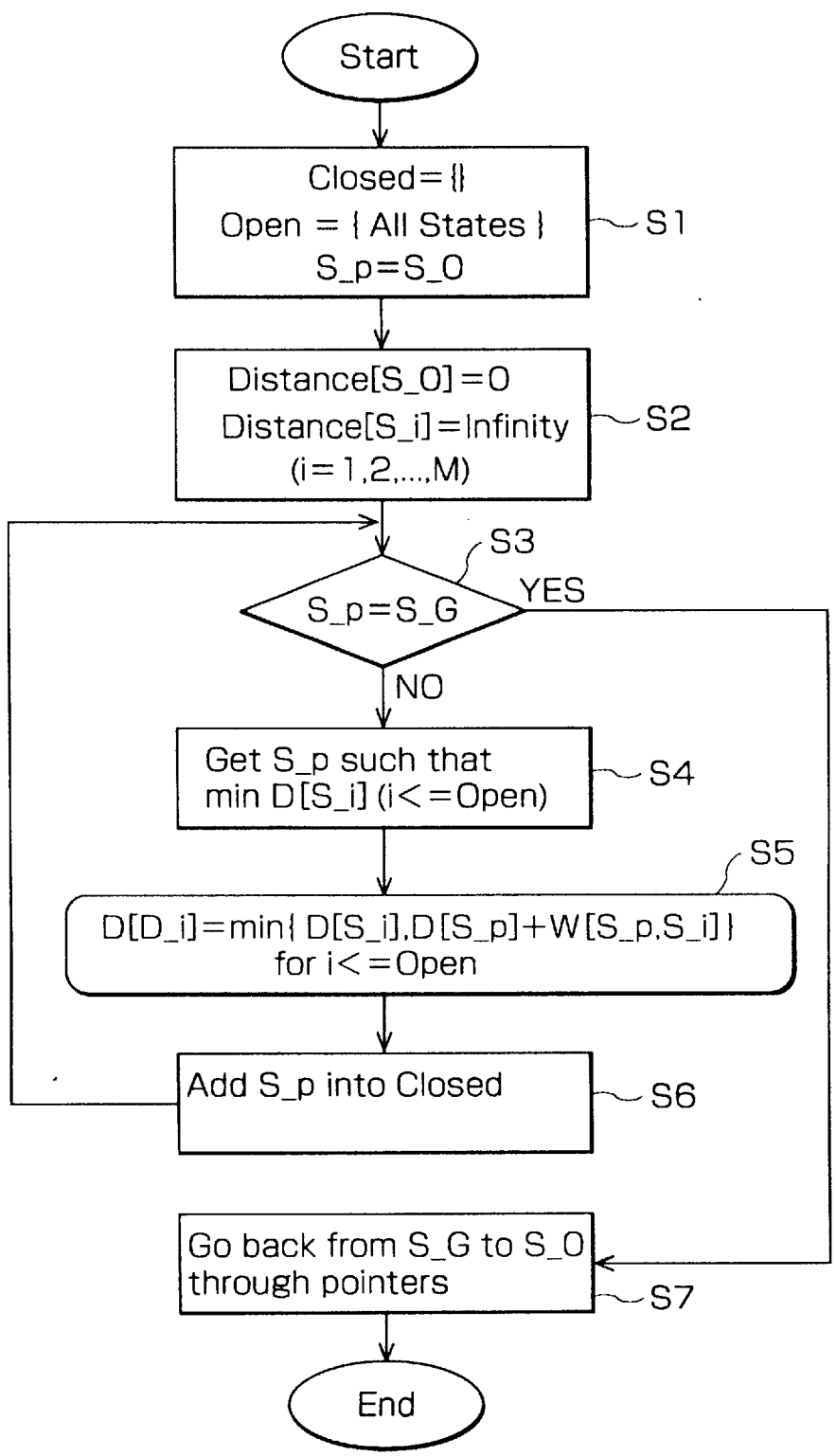
FIG. 6 is a flow chart of the processing of the path selection portion shown in FIG. 3.

FIG. 6 is a flow chart of the processing of the path selection portion 142.

As shown in FIG. 6, the path selection portion 142 as an initial setting makes the open list group (OPEN) all of the states and makes the closed list group (CLOSED) empty (S1). Further, it makes the starting connected state $S_s$ (S2).

If the target state and the connected state match, the target state has already been reached, so the search of the state is ended (S3).

The pointer is followed in the closed list group from the target state to the starting state to resort from the starting state to the target state in reverse (S7).

Step S1 corresponds to S5, S6, S3, and S4 in the flow of FIG. 6. First, the smaller of D[Si] and D[Sp]+W[Sp,Si] is selected from the open list and changed to the new D[Si]. Further, the Si giving the smallest D[Si] for this new D[Si] is found. From the table, D[S3] =1 is the smallest, so $S_p$ is made S3 and D[$S_p$] is made 1, S3 is moved from the open list to the closed list, and the routine proceeds to the next step. The candidate for the path to the smallest D[S5] at this point of time has not yet been found.

Step S2 updates D[Si] in a similar manner. If the smallest is selected, D[S4]=3 is the smallest in the table. $S_p$ is made S4 and D[Sp] is made 3, then S4 is moved from the open list to the closed list and the routine proceeds to the next step. S2-S3-S5 is found as the candidate for the path to the smallest D[S5] at this point of time.

At step S3, D[S5] becomes the smallest. Since S5 is the target, the search ends here. That is, the path of S2-S3-S5 is found.

The table gives the next steps. Next, S1 is the smallest.

| Step | Closed | Open | $S_p$ | D[$S_p$] | D[S1] | D[S2] | D[S3] | D[S4] | D[S5] | min$_i$ D[Si] | pass to S5 |
|---|---|---|---|---|---|---|---|---|---|---|---|
| 0 |  | 1, 2, 3, 4, 5 | 2 | 0 | ∞ | 0 | ∞ | ∞ | ∞ | 2 | * |
| 1 | 2 | 1, 3, 4, 5 | 2 | 0 | 10 | * | 1 | 5 | ∞ | 3 | * |
| 2 | 2, 3 | 1, 4, 5 | 3 | 1 | 1 + 4 | * | * | 1 + 2 | 1 + 2 | 4 | 2 − 3 − 5 |
| 3 | 2, 3, 4 | 1, 5 | 4 | 3 | 5 | * | * | * | 3 | 5 | 2 − 3 − 5 |
| 4 | 2, 3, 4, 5 | 1 | 5 | 3 | 5 | * | * | * | * | 1 |  |

Due to the above processing, the series of operational arcs connecting the states is produced and the execution of the path selection portion 142 is ended.

If the target state and the connected state do not match, a state giving the smallest evaluation variable in the open list group is made the new connected state $S_p$ and added to the closed list group (S4).

The evaluation variables in the open list are updated using the new connected state $S_p$ (S5).

Further, the connected state $S_p$ is added from the open list to the closed list and the processing of S3 is returned to (S6).

Note that the processing of S4 to S6 is repeated until the conditions of S3 are satisfied.

Next, an explanation will be added regarding the path search in a graph giving a specific example based on the flow of FIG. 6. However, for reasons of the table and convenience in explanation, the order of "S4" and "S5" is switched from the flow of FIG. 6. Due to the switch, the evaluation of min D[Si] is "S5" and a new D[Si] is changed to, but since the starting state is set to $S_p$ at the initial stage, at the first "S4" the processing is just for resetting D[Sp] to 0, so the processing is equivalent. This method is a widely known search method called the Dijkstra method.

Figure 7:
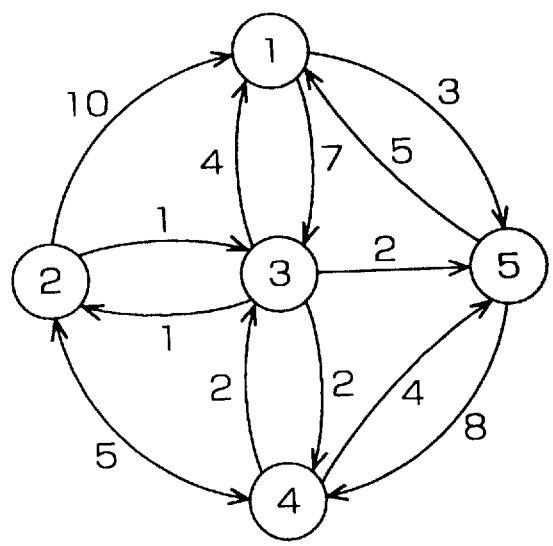
FIG. 7 is a view showing an example of the path search.

Next, a graph of the weighting such as shown in FIG. 7 is considered and a path search is conducted starting from S2 and ending at S5.

Step S0 corresponds to S1, S2, S3, and S4 in the flow of FIG. 6. Here, the closed list is empty and the open list contains all of 1, 2, 3, 4, and 5. Here, $S_p$=2 is selected, everything except for D[S2] is made ∞, and D[S2] is set to 0. The Si with the smallest value of D[Si] in this state is sought. As shown in the table, D[S2] is the smallest, $S_p$=S2 is selected again, D[Sp] is made 0, S2 is moved from the open list to the closed list, then the routine proceeds to the next step.

Operation of Arc Selection Portion 144

The arc selection portion 144 selects based on probability one of the operational arcs included in the operational path selected by the path selection portion 142 based on the weighting coefficients given to the operational arcs. That is, the arc selection portion 144 selects one of the at least one operational arcs included in the operational path and present between two directly passable states and decides on the final operational path.

The arc selection portion 144 selects based on probability one operational arc from among the operational arcs $A^k_{ij}$ which each of the operational arcs $A_{ij}$ in the operational path include a plurality of for the operational path selected by the path selection portion 142.

For example, when there are three operational arcs able to be selected from and their probabilities are 5/8, 2/8, and 1/8, when the selection processing is performed eight times these are selected five, two, and one time respectively.

The processing routine of the selection first considers uniform random numbers in the range of the numerical values [$R_0$, $R_1$] and defines the region [$s_k$, $e_k$] corresponding to the operational arc $A^k_{ij}$ by the following equation.

$$\left[ (R_1 - R_0) \sum_{i=0}^{k-1} p^i, (R_1 - R_0) \sum_{i=0}^{k} p^i \right] \quad (10)$$

Here, in the above quation. $P^r$ shows the probability coefficient and $P^o$=0.

When the value v of the unifoorm random number is in the range of $s_k \leq v < e_k$, the operational arc $A^k_{ij}$ corresponding to the value v of the uniform random number is selected.

By this selection, the operational path from the starting state $S_s$ to the target state $S_c$ of the robot is defined by the following equation using the selected operational arc $A^k_{ij}$.

$$A_{0,1_1}^k \leftarrow A_{1_1,1_1}^k \leftarrow A_{1_1,1_2}^k \leftarrow \ldots \leftarrow A_{1_{m-1},1_{m-1}}^k \leftarrow A_{1_{m-1},G}^k \quad (11)$$

In equation (11), ←shows a nonexistent path, that is, there is no path from $A_{0,11}^k$ to $A_{11,11}^k$.

Operation of Data Transmission Portion 146

The data transmission portion 146 produces along with time the operating data to be given to the drive portions 120a to 120d for realizing the operation of the robot 1 shown by the operational arcs included in the operational path determined by the arc selection portion 144 and supplies it to the drive portions 120a to 120d.

As shown in the explanation of the operation of the arc selection portion 144, the series of operational arcs $A_{ij}^k$ from the starting state $S_s$ of the robot 1 to the target state $S_G$ is output.

The data transmission portion 146 selects the operational arc $A_{GG}^k$ from the target state $S_G$ to the target state $S_G$ by the same procedure an the selection of the operational arc by the arc selection portion 144 and adds it to the end of the series of the operational arc (11).

Accordingly, finally, the following series of operational arcs is produced by the data transmission portion 146:

$$A_{k01_1} \leftarrow A_{1_1,1_1}^k \leftarrow A_{1_1,1_2}^k \leftarrow A_{1_2,1_2}^k \leftarrow \ldots \leftarrow A_{1_{m-1},1_{m-1}}^k \leftarrow A_{1_{m-1},G}^k \leftarrow A_{G,G}^k \quad (12)$$

Figure 8:
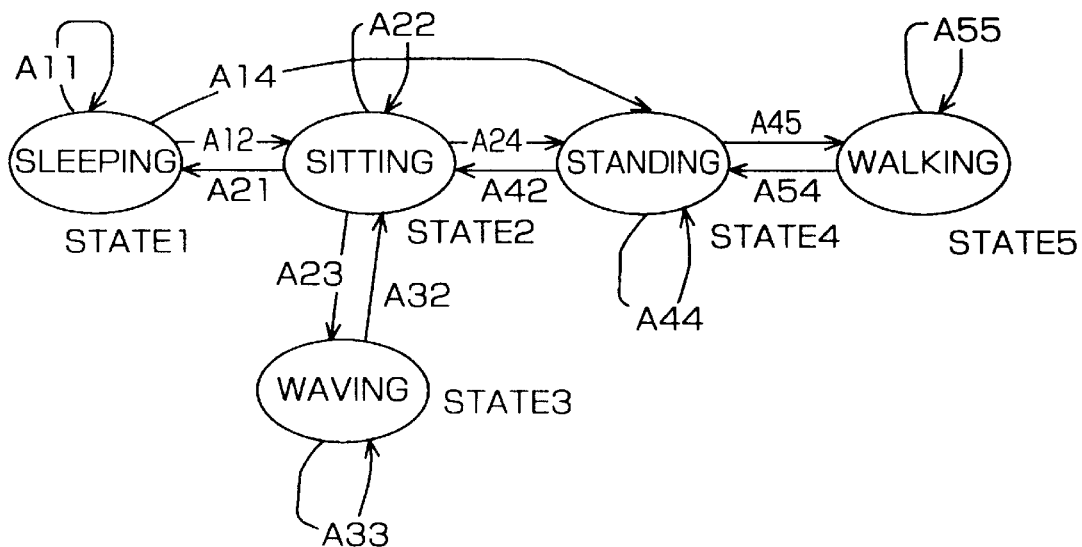
FIG. 8 is a status transition chart giving weighting coefficients to the status transition chart shown in FIG. 4, specifying the state 3 as the starting state, and specifying the state 4 as the target state.

FIG. 8 is a status transition chart giving weighting coefficients to the status transition chart shown in FIG. 4, specifying the state 3 as the starting state, and specifying the state 4 as the target state.

Figure 9:
FIG. 9 is a view of the operational arcs determined by the status transition preparation portion, path selection portion, arc selection portion, and data transmission portion shown in FIG. 3.

FIG. 9 is a view of the operational arcs determtned by the status transition preparation portion 140, path selection portion 142, arc selection portion 144, and data transmission portion 146 based on the status transition chart shown in FIG. 8.

As shown in FIG. 8 and FIG. 9, the data transmission portion 146 produces the time-based operating data to be given to the drive portions 120a to 120d to cause the robot to perform the operation indicated by the operational arcs and supplies them to the drive portions 120a to 120d.

However, when the starting state $S_s$ and the target state $S_G$ match, the series of operational arcs $A_{GG}^k$ is produced. At this time, the operating data corresponding to the series of operational arcs $A_{GG}^k$ is not supplied to the drive portions 120a to 120d. In this case, the state is not particularly changed and therefore useless processing can be eliminated.

Below, the operation of the robot 1 will be explained.

The status transition preparation portion 140 of the control portion 12 detects the state of passage of the robot 1 from the starting state to the target state, prepares a status transition list based on the detected state, the operational arcs when passing between states, and the status transition chart shown in FIG. 4, and gives to each of the operational arcs a weighting coefficient corresponding to the probable weight $P^k$ shown in equation 1.

The path selection portion 142 selects a group of the operational arcs giving the smallest sum of weighting coefficients of the operational arcs included in the operational path in accordance with the routine shown in equation 2 to equation 9 and FIG. 6 as the operational path which the robot 1 passes from the starting state to the target state.

The arc selection portion 144 selects based on probability one of the operational arcs included in the operational path selected by the path selection portion 142 in accordance with the routine shown in equation 10 and equation 11 based on the weighting coefficients given to the operational arcs and decides on the final operational path.

The data transmission portion 146 produces the operating data along with time to be given to the drive portions 120a to 120d to realize the operation of the robot shown by the operational arcs included in the operational path decided on by the arc selection portion 144 and supplies it to the drive portions 120a to 120d.

The drive portions 120a to 120d drive the legs 10a to 10d in accordance with the operating data supplied from the data transmission portion 146 to realize the operation of each state from the starting state to the target state and the operations of the robot 1 shown by the operational arcs included in the final operational path.

As explained above, according to the apparatus for the control of the actions of robots of the present invention, the robot 1 can be given a plurality of patterns of action based on the operations of the robot 1 in each predefined state and the operations of the robot 1 in transition between states where one or more defined operational arcs are shown.

Further, even if the robot 1 is operated several times from the starting state to the target state in the same way, each time it operates from a new starting state to the target state, an operational path including a different operational arc is finally determined by the arc selection portion 144, so the operations of the robot become diversified and the expressability becomes enhanced.

Note that in the above explanation, reference was made to the case of determination of the operational path based on the states, operational arcs, and weighting coefficients prefixed by the control portion 12 for the robot 1, but for example the selectable operational arcs may be limited based on sensor data input from the sensor 16 or dynamic changes may be made to the values of the weighting coefficients or other steps taken so as to change the pattern of action of the robot 1 in accordance with its surrounding environment.

Further, the contents of the operations in the program of the control portion 12 were illustrations. It is also possible to realize the robot control method of the present invention using just the necessary portions extracted in accordance with the application of the robot 1.

As explained above, according to the methods and apparatus for control of a robot of the present invention, it is possible to make the operations of a robot more diversified.

Further, according to the methods and apparatus for control of a robot of the present invention, it is possible to increase the number of matter expressable by the operations of the robot.

Further, according to the methods of control of a robot of the present invention, it is possible to enhance the expressability of the operations of a robot.

What is claimed is:

1. A robot control method for controlling the operation of a robot so as to pass through a plurality of states corresponding to a predetermined operation, comprising:

determining at least one operational arc between two directly passable states among the plurality of states showing the operation of said robot when passing between the two states, giving to each of the determined operational arcs a weighting coefficient corresponding to the probability of that operational arc being selected, selecting on a probable basis one of said operational arcs between said two states when making the operation of the robot pass between said two states based on said weighting coefficients of the operational arcs between said two states, and controlling the robot so as to perform the operation shown by the selected operational arc when making the operation of the robot pass between said two states; and controlling the robot so as to return to a first of said two states, wherein said operational arc includes a self operational arc showing the operation of said robot when returning to the first state.

2. A robot control method as set forth in claim 1, when making the operation of the robot pass between two or more states among the plurality of states, operational arcs are selected between each two directly passable states among said two or more states so that the sum of the weighting coefficients becomes smallest.

3. A robot control method as set forth in claim 1, wherein said operational arc includes a self operational arc showing the operation of said robot when returning from one state among the plurality of states to the same one state.

4. A robot control apparatus for controlling the operation of a robot having a plurality of states corresponding to a predetermined operation, at least one operational arc being determined between each of any two directly passable states among said plurality of states showing the operation of the robot when passing between said two states, comprising a weighting means for giving to each of the determined arcs of operation a weighting coefficient corresponding to the probability of that operational arc being selected, an operational arc selecting means for selecting based on probability one of said operational arcs between said two states when making the operation of the robot pass between said two states based on said weighting coefficients of the operational arcs between said two states, an operating data producing means for producing along with time operating data corresponding to the operation of said robot shown by said selected operational arc, and controlling means for controlling the operation of the robot based on said produced operating data, wherein said operating data producing means suppresses the production of said operating data corresponding to said self operational arc before said transition in state and after said transition in state when the states of the robot before the transition of state and after the transition of state coincide.

5. A robot control apparatus as set forth in claim 4, wherein said operational arc includes a self operational arc showing the operation of said robot when returning from one state among the plurality of states to said same one state.

\* \* \* \* \*